United States Patent
Mazurenko et al.

(10) Patent No.: US 9,362,977 B2
(45) Date of Patent: Jun. 7, 2016

(54) INCREMENTAL PREAMBLE DETECTION

(75) Inventors: Ivan Leonidovich Mazurenko, Khimki (RU); Alexander Alexandrovich Petyushko, Bryansk (RU); Meng-Lin Yu, Morganville, NJ (US); Jian-Guo Chen, Basking Ridge, NJ (US)

(73) Assignee: Intel Corporation, Santa Clara, CA (US)

( * ) Notice: Subject to any disclaimer, the term of this patent is extended or adjusted under 35 U.S.C. 154(b) by 351 days.

(21) Appl. No.: 13/566,146

(22) Filed: Aug. 3, 2012

(65) Prior Publication Data

US 2013/0195007 A1 Aug. 1, 2013

Related U.S. Application Data

(60) Provisional application No. 61/552,242, filed on Oct. 27, 2011.

(30) Foreign Application Priority Data

Jan. 27, 2012 (RU) ................................. 2012102842

(51) Int. Cl.
   *H04B 1/7075* (2011.01)
   *H04L 7/04* (2006.01)

(52) U.S. Cl.
   CPC ............ *H04B 1/70755* (2013.01); *H04L 7/042* (2013.01)

(58) Field of Classification Search
   CPC .............. H04W 74/08; H04W 74/0833; H04J 13/0062; H04J 13/0055; H04B 1/7113; H04B 1/709; H04L 5/0007; H04L 27/2613; H04L 7/042
   See application file for complete search history.

(56) References Cited

U.S. PATENT DOCUMENTS

| 4,673,941 A | 6/1987 | Van Der Mark |
| 5,276,633 A | 1/1994 | Fox et al. |

(Continued)

FOREIGN PATENT DOCUMENTS

| EP | 2256937 A1 | 12/2010 |
| KR | 20050064485 A | 6/2005 |

(Continued)

OTHER PUBLICATIONS

"3rd Generation Partnership Project; Technical Specification Group Radio Access Network; Physical Channels and Mapping of Transport Channels Onto Physical Channels (FDD)," 3GPP (3rd Generation Partnership Project) TS 25.211 V9.1.0 (Dec. 2009) Technical Specification.

(Continued)

*Primary Examiner* — Jung Park

(57) ABSTRACT

In one embodiment, the present invention is a method for performing incremental preamble detection in a wireless communication network. The method processes non-overlapping chunks of incoming antenna data, where each chunk is smaller than the preamble length, to detect the signature of the transmitted preamble. For each chunk processed, chips of the chunk are correlated with possible signatures employed by the wireless network to update a set of correlation profiles, each profile comprising a plurality of profile values. Further, an intermediate detection is performed by comparing the updated profile values to an intermediate threshold that is also updated for each chunk. Upon receiving the final chunk, the correlation profiles are updated, and a final preamble detection is made by comparing the updated profile values to a final threshold. Detections are performed on an incremental basis to meet latency requirements of the wireless network.

21 Claims, 10 Drawing Sheets

(56) References Cited

U.S. PATENT DOCUMENTS

| | | |
|---|---|---|
| 5,381,357 A | 1/1995 | Wedgwood et al. |
| 5,416,845 A | 5/1995 | Qun |
| 5,706,314 A | 1/1998 | Davis et al. |
| 5,949,831 A | 9/1999 | Coker et al. |
| 6,118,832 A | 9/2000 | Mayrargue et al. |
| 6,150,976 A | 11/2000 | Cooley |
| 6,151,682 A | 11/2000 | van der Wal et al. |
| 6,158,027 A | 12/2000 | Bush et al. |
| 6,163,788 A | 12/2000 | Chen et al. |
| 6,446,193 B1 | 9/2002 | Alidina et al. |
| 6,529,925 B1 | 3/2003 | Schenk |
| 6,580,768 B1 | 6/2003 | Jquette |
| 6,625,235 B1 | 9/2003 | Coker et al. |
| 6,643,814 B1 | 11/2003 | Cideciyan et al. |
| 6,798,843 B1 | 9/2004 | Wright et al. |
| 6,801,086 B1 | 10/2004 | Chandrasekaran |
| 7,110,477 B2 | 9/2006 | Suissa et al. |
| 7,133,387 B2 | 11/2006 | Nakada |
| 7,167,513 B2 | 1/2007 | Tsui et al. |
| 7,313,373 B1 | 12/2007 | Laskharian et al. |
| 7,336,730 B2 | 2/2008 | Auranen et al. |
| 7,349,375 B2 | 3/2008 | Gerakoulis |
| 7,441,105 B1 | 10/2008 | Metzgen |
| 7,471,739 B1 | 12/2008 | Wright |
| 7,477,634 B1 | 1/2009 | McKown |
| 7,593,492 B1 | 9/2009 | Lande |
| 7,613,228 B2 | 11/2009 | Niedzwiecki |
| 7,656,837 B2 | 2/2010 | Gerakoulis |
| 7,869,482 B2 | 1/2011 | Kubota et al. |
| 7,895,252 B2 | 2/2011 | Sazegari et al. |
| 8,583,152 B2 | 11/2013 | Ishii et al. |
| 8,711,988 B2 | 4/2014 | Chen |
| 8,831,133 B2 | 9/2014 | Azadet et al. |
| 8,897,388 B2 | 11/2014 | Molina et al. |
| 8,982,992 B2 | 3/2015 | Azadet et al. |
| 2001/0043582 A1 | 11/2001 | Nakada |
| 2001/0050926 A1 | 12/2001 | Kumar |
| 2002/0057735 A1 | 5/2002 | Piirainen |
| 2002/0062436 A1 | 5/2002 | Van Hook et al. |
| 2002/0101835 A1 | 8/2002 | Gerakoulis |
| 2003/0112904 A1 | 6/2003 | Fuller et al. |
| 2003/0152165 A1 | 8/2003 | Kondo et al. |
| 2003/0223505 A1 | 12/2003 | Verbin et al. |
| 2004/0052314 A1 | 3/2004 | Copeland |
| 2004/0180679 A1 | 9/2004 | Porter |
| 2004/0184421 A1* | 9/2004 | Hondo .......................... 370/329 |
| 2004/0202137 A1 | 10/2004 | Gerakoulis |
| 2004/0248516 A1 | 12/2004 | Demir et al. |
| 2005/0001675 A1 | 1/2005 | Saed |
| 2005/0036575 A1 | 2/2005 | Kuchi et al. |
| 2005/0108002 A1 | 5/2005 | Nagai et al. |
| 2006/0029149 A1 | 2/2006 | Kim et al. |
| 2006/0109938 A1 | 5/2006 | Challa et al. |
| 2006/0176969 A1 | 8/2006 | Trivedi |
| 2006/0198466 A1 | 9/2006 | Wright et al. |
| 2006/0240786 A1 | 10/2006 | Liu |
| 2007/0005674 A1 | 1/2007 | Sazegari et al. |
| 2007/0087770 A1 | 4/2007 | Gan |
| 2007/0189402 A1 | 8/2007 | Yang |
| 2008/0019422 A1 | 1/2008 | Smith et al. |
| 2008/0027720 A1 | 1/2008 | Kondo et al. |
| 2008/0056403 A1 | 3/2008 | Wilson |
| 2008/0074155 A1 | 3/2008 | Jaklitsch |
| 2008/0095265 A1 | 4/2008 | Cai et al. |
| 2008/0107046 A1 | 5/2008 | Kangasmaa et al. |
| 2008/0187057 A1 | 8/2008 | Qu |
| 2008/0192860 A1 | 8/2008 | Harwood et al. |
| 2008/0219220 A1 | 9/2008 | Gerakoulis |
| 2008/0247487 A1 | 10/2008 | Cai et al. |
| 2008/0316076 A1 | 12/2008 | Dent et al. |
| 2009/0006514 A1 | 1/2009 | Kountouris |
| 2009/0029664 A1 | 1/2009 | Batruni |
| 2009/0079627 A1 | 3/2009 | Sun et al. |
| 2009/0116576 A1 | 5/2009 | Dowling |
| 2009/0164542 A1 | 6/2009 | Wu et al. |
| 2009/0225899 A1 | 9/2009 | Dent |
| 2009/0245406 A1 | 10/2009 | Moffatt et al. |
| 2009/0257421 A1 | 10/2009 | Nakashima et al. |
| 2009/0285335 A1 | 11/2009 | Hoshuyama |
| 2009/0325513 A1* | 12/2009 | Iwai et al. ..................... 455/91 |
| 2010/0027592 A1* | 2/2010 | Arviv et al. ................. 375/150 |
| 2010/0067511 A1 | 3/2010 | Peters |
| 2010/0098139 A1 | 4/2010 | Braithwaite |
| 2010/0124257 A1 | 5/2010 | Yahya |
| 2010/0138468 A1 | 6/2010 | Azadet et al. |
| 2010/0144333 A1 | 6/2010 | Kiasaleh et al. |
| 2010/0158051 A1 | 6/2010 | Hadzic et al. |
| 2010/0198893 A1 | 8/2010 | Azadet et al. |
| 2010/0198894 A1 | 8/2010 | Azadet et al. |
| 2010/0225390 A1 | 9/2010 | Brown et al. |
| 2010/0246714 A1 | 9/2010 | Yang et al. |
| 2010/0255867 A1 | 10/2010 | Ishii et al. |
| 2010/0273427 A1 | 10/2010 | Mergen et al. |
| 2010/0316112 A1 | 12/2010 | Huang et al. |
| 2011/0002249 A1 | 1/2011 | Gerakoulis |
| 2011/0007907 A1 | 1/2011 | Park et al. |
| 2011/0019724 A1 | 1/2011 | Agazzi |
| 2011/0025414 A1 | 2/2011 | Wolf et al. |
| 2011/0055303 A1 | 3/2011 | Slavin |
| 2011/0059710 A1 | 3/2011 | Cai et al. |
| 2011/0080902 A1 | 4/2011 | Jang |
| 2011/0096824 A1 | 4/2011 | Agazzi et al. |
| 2011/0170421 A1 | 7/2011 | Gerakoulis |
| 2011/0255011 A1 | 10/2011 | Gu et al. |
| 2011/0268167 A1 | 11/2011 | Sundström |
| 2011/0302230 A1 | 12/2011 | Ekstrand |
| 2012/0087406 A1 | 4/2012 | Lim et al. |
| 2012/0093209 A1 | 4/2012 | Schmidt et al. |
| 2012/0106614 A1 | 5/2012 | Kim et al. |
| 2012/0188994 A1 | 7/2012 | Palanki et al. |
| 2012/0280840 A1 | 11/2012 | Kyeong et al. |
| 2012/0295657 A1 | 11/2012 | Okazaki |
| 2013/0007082 A1 | 1/2013 | Elenes |
| 2013/0022157 A1 | 1/2013 | Hollevoet et al. |
| 2013/0044794 A1 | 2/2013 | Wenzel et al. |
| 2013/0070867 A1 | 3/2013 | To et al. |
| 2013/0114652 A1 | 5/2013 | Molina et al. |
| 2013/0114761 A1 | 5/2013 | Azadet et al. |
| 2013/0114762 A1 | 5/2013 | Azadet et al. |
| 2013/0117342 A1 | 5/2013 | Azadet et al. |
| 2013/0195007 A1 | 8/2013 | Mazurenko et al. |
| 2014/0016626 A1 | 1/2014 | Dai et al. |
| 2014/0064417 A1 | 3/2014 | Azadet |
| 2014/0072073 A1 | 3/2014 | Azadet et al. |
| 2014/0075162 A1 | 3/2014 | Azadet et al. |
| 2014/0086356 A1 | 3/2014 | Azadet et al. |
| 2014/0086361 A1 | 3/2014 | Azadet et al. |
| 2014/0086367 A1 | 3/2014 | Azadet et al. |
| 2014/0108477 A1 | 4/2014 | Azadet et al. |

FOREIGN PATENT DOCUMENTS

| | | |
|---|---|---|
| WO | WO2007010331 A1 | 1/2007 |
| WO | WO2007104362 A1 | 9/2007 |
| WO | WO2008057584 A2 | 5/2008 |
| WO | 2011/058843 A1 | 5/2011 |
| WO | 2011/101233 A1 | 8/2011 |
| WO | 2013/063434 A1 | 5/2013 |
| WO | 2013/063440 A1 | 5/2013 |
| WO | 2013/063443 A1 | 5/2013 |
| WO | 2013/063447 A1 | 5/2013 |
| WO | 2013/063450 A1 | 5/2013 |
| WO | 2013/066756 A1 | 5/2013 |

OTHER PUBLICATIONS

"3rd Generation Partnership Project; Technical Specification Group Radio Access Network; Multiplexing and channel Coding (FDD)," 3GPP (3rd Generation Partnership Project) TS 25.212 V7.9.0 (Sep. 2008) Technical Specification.

"3rd Generation Partnership Project; Technical Specification Group Radio Access Network; Spreading and Modulation (FDD)," 3GPP (3rd Generation Partnership Project) TS 25.213 V9.2.0 (Sep. 2010) Technical Specification.

(56) References Cited

OTHER PUBLICATIONS

"3rd Generation Partnership Project; Technical Specification Group Radio Access Network; Physical Layer Procedures (FDD)," 3GPP (3rd Generation Partnership Project) TS 25.219 V9.2.0 (Mar. 2010) Technical Specification.
Li, "FIR Filtering Using Vector Transformation and Convolution Processor", 1990, IEEE, pp. 1223-26.
Gopalan et al., "An Optimization Approach to Single-Bit Quantization", IEEE Transactions on Circuits and Systems-I: Regular Papers, vol. 56, No. 12, Dec. 2009, pp. 2655-2668.
Venkataraman et al., "An All-Digital Transmitter with a 1-Bit DAC", IEEE Transactions on Communications, vol. 55, No. 10, Oct. 2007, pp. 1951-1962.
Office action received for U.S. Appl. No. 13/661,295, mailed on Feb. 28, 2014, 8 pages.
Notice of Allowance received for U.S. Appl. No. 13/661,295, mailed on Aug. 4, 2014, 7 pages.
Office action received for U.S. Appl. No. 13/661,351, mailed on May 23, 2014, 32 pages.
Office action received for U.S. Appl. No. 13/661,351, mailed on Nov. 14, 2014, 28 pages.
Office action received for U.S. Appl. No. 13/661,351, mailed on Mar. 26, 2015, 39 pages.
Office action received for U.S. Appl. No. 13/661,355, mailed on Jun. 4, 2015, 17 pages.
Office action received for U.S. Appl. No. 13/661,355, mailed on Feb. 6, 2015, 14 pages.
Office action received for U.S. Appl. No. 13/661,355, mailed on Sep. 25, 2014, 12 pages.
Office action received for U.S. Appl. No. 13/661,357, mailed on Oct. 18, 2013, 7 pages.
Notice of Allowance received for U.S. Appl. No. 13/661,357, mailed on May 13, 2014, 6 pages.
Office action received for U.S. Appl. No. 13/701,369, mailed on Jun. 24, 2014, 16 pages.
Office action received for U.S. Appl. No. 13/701,374, mailed on May 29, 2015, 7 pages.
Office action received for U.S. Appl. No. 13/701,384, mailed on Dec. 31, 2014, 21 pages.
Office action received for U.S. Appl. No. 13/701,415, mailed on Aug. 1, 2014, 11 pages.
Notice of Allowance received for U.S. Appl. No. 13/701,415, mailed on Nov. 20, 2014, 5 pages.
Office action received for U.S. Appl. No. 14/090,555, mailed on Nov. 17, 2014, 20 pages.
Office action received for U.S. Appl. No. 13/701,384, mailed on Jul. 16, 2015, 21 pages.
Notice of Allowance received for U.S. Appl. No. 14/090,555, mailed on Aug. 12, 2014, 8 pages.
Office action received for U.S. Appl. No. 13/701,376, mailed on Jul. 22, 2015, 9 pages.
Office action received for U.S. Appl. No. 13/701,397, mailed on Jul. 30, 2015, 15 pages.
Supplementary European Search Report for EP Patent Application No. EP12846556, mailed on Jun. 24, 2015, 6 pages.
Supplementary European Search Report for EP Patent Application No. EP12843512, mailed on Jun. 2, 2015, 6 pages.
Supplementary European Search Report for EP Patent Application No. EP12842850, mailed on Jun. 25, 2015, 4 pages.
Supplementary European Search Report for EP Patent Application No. EP12843913, mailed on Jul. 9, 2015, 6 pages.
Final Office Action received for U.S. Appl. No. 13/661,351, dated Sep. 10, 2015, 15 pages of office action.
Non-final Office Action received for U.S. Appl. No. 13/701,374, dated Aug. 24, 2015, 8 pages of office action.
Notice of Allowance received for U.S. Appl. No. 14/090,555, dated Aug. 12, 2015, 8 pages.
Negener, A.: "High-Performance Crest Factor Reduction Processor for W-CDMA and OFDM Applications", Radio Frequency Integrated Circuits (RFIC) Symposium, Jun. 2006, 4 pages, IEEE, USA.
Gopalan, R. et al.: "An Optimization Approach to Single-Bit Quantization", IEEE Transactions on Circuits and Systems I: Regular Papers, Dec. 2009, pp. 2655-2668, vol. 56, Issue 12, IEEE, USA.
Gopalan, R. et al.: "On an optimum algorithm for waveform synthesis and its applications to digital transmitters", Wireless Communications and Networking Conference, Mar. 2005, pp. 1108-1113, vol. 2, IEEE, USA.
Venkatamaran, J. et al.: "An All-Digital Transmitter with a 1-Bit DAC", IEEE Transactions on Communications, Oct. 2007, pp. 1951-1962, vol. 55, Issue 10, IEEE, USA.
European Search Report received for the corresponding EP application No. EP 12 84 3913.0, mailed on Jul. 9, 2015, 7 pages.
European Search Report received for the corresponding EP application No. EP 12 84 2850.5, mailed on Jun. 25, 2015, 5 pages.
Notice of Allowance received for U.S. Appl. No. 14/168,615, dated Feb. 4, 2016, 7 pages.
Corrected Notice of Allowability for U.S. Appl. No. 14/168,615, dated Feb. 24, 2016, 2 pages.

\* cited by examiner

```
1    Initialization step:
2    num_CAS_steps = M/CAS;                                              200
3    for k=1..num_possible_signatures
4      s = possible_signatures(k);
5      for lag=1..max_lag
6        profile(s, lag) = 0;
7      end
8    end
9
10   Processing step (for antenna chunk x_t, t=1..5120/M):
11   sum = 0;
12   for k=1..num_possible_signatures
13     s = possible_signatures(k);
14     for lag=1..max_lag
15       for j=1..num_CAS_steps    // Here j corresponds to coherent accumulation window index
16         CA = 0;
17         for n=0..CAS-1       // Here n stands for a relative index inside coherent accumulation frame
18           i = (j-1)*CAS + n; // Here i stands for absolute index of a chip in preamble pattern
19           i0 = lag + i - (t-1)*M; // Here i0 stands for an index of a lag-shifted chip
20                               // relative to a beginning of a chunk
21           if (i0>=0 && i0<M) // bounds checking – here we check if we are inside the chunk
22             CA += x_t[i0] * c_pre_s[i];
23           end
24         end
25         profile(k, lag) += abs(CA);
26       end
27           sum += profile(k, lag);
28     end
29   end
30
31   Intermediate processing step // done for every t=1..5120/M
32   // Here min_lag2 and max_lag2 values are selected heuristically
33   threshold1 = C1 * sum / ((max_lag2-min_lag2+1) * num_possible_signatures);
34   for k=1..num_possible_signatures
35     s = possible_signatures(k);
36     for lag=min_lag2..max_lag2
37       if profile(k, lag)>threshold1 // Here threshold1 is selected heuristically
38         // signature s is detected at delay lag!
39         // In this case if we search for a single preamble only, we can stop processing
40         // but in general case we need to search for all potential preambles,
41         // so processing will continue if we have enough computational resources for this
42       end
43       // if a preamble is not detected, processing continues
44     end
45   end
46
```

FIG. 2(A)

```
47  Post processing step // done for t=5120/M
48  threshold2 = C2 * sum / (max_lag * num_possible_signatures);
49  for k=1..num_possible_signatures
50     s = possible_signatures(k);
51     for lag=1..max_lag
52        if profile(k, lag)>threshold2
53           // signature s is detected at delay lag!
54        end
55     end
56  end
```

FIG. 2(B)

```
1   Initialization step:
2   num_CAS_steps = M/CAS;                                          400
3   for k=1..num_possible_signatures
4     s = possible_signatures(k);
5     for lag=1..max_lag
6       profile(s, lag) = 0;
7     end
8   end
9   for k=0:4095 S_pre(k) = c_long(k) × × sqrt(2); end
10
11  Processing step (for antenna chunk x_t, t=1..5120/M):
12  sum = 0;
13  for lag=1..max_lag
14    for j=1..num_CAS_steps
15      for stream=0:15
16        CA[stream] = 0;
17        for n=0..CAS/16-1
18          i = (j-1)*CAS/16 + n;
19          i0 = lag + i*16 + stream - (t-1)*M;
20          if (i0>=0 && i0<M) // bounds checking
21            CA[stream] += x_t[ i0 ] * S_pre[ i*16 + stream ];
22          end
23        end
24      end
25      profile(1:16, lag) += abs(H*CA); // H is 16x16 Hadamard matrix; H*CA is matrix by vector
26  mult.
27    end
28    sum += sum(profile(s, lag), s=1..16);
29  end
30
31  Intermediate processing step // done for every t=1..5120/M
32  // Here min_lag2 and max_lag2 values are selected heuristically
33  threshold3 = C3 * sum / ((max_lag2-min_lag2+1) * num_possible_signatures);
34  for k=1..num_possible_signatures
35    s = possible_signatures(k);
36    for lag=min_lag2..max_lag2
37      if profile(k, lag)>threshold3 // Here threshold3 is selected heuristically
38        // signature s is detected at delay lag!
39        // In this case if we search for a single preamble only, we can stop processing
40        // but in general case we need to search for all potential preambles,
41        // so processing will continue if we have enough computational resources for this
42      end
43      // if a preamble is not detected, processing continues
44    end
45  end
46                                      FIG. 4(A)
```

```
47  Post processing step
48  threshold4 = C4 * sum / (max_lag * num_possible_signatures);
49  for k=1..num_possible_signatures
50     s = possible_signatures(k);
51     for lag=1..max_lag
52        if profile(k, lag) > threshold4
53           // signature s is detected at delay lag!
54        end
55     end
56  end
```

INCREMENTAL PREAMBLE DETECTION

BACKGROUND OF THE INVENTION

1. Field of the Invention

The present invention relates to signal processing, and, more specifically but not exclusively, to preamble detection for wide-band code-division multiple access (WCDMA) and other wireless standards.

2. Description of the Related Art

In WCDMA and other wireless standards, user equipment, such as cell phones, transmit preambles to inform base transceiver stations (BTSs) that the user equipment (UE) is willing to establish a connection to the network. In systems that adhere to the 3GPP standards, the preamble, which is transmitted on the physical random access channel (PRACH), is a 4,096-chip sequence comprising 256 repetitions of a 16-bit signature code. The 3GPP standard allows for up to 16 different signature codes, commonly referred to as the 16 Hadamard codes, and often, only a subset of the 16 possible signature codes is employed in a given system. Before transmitting, the signature code is scrambled using a long scrambling code. The scrambling code is constructed from scrambling sequences, and there are 8,192 PRACH preamble scrambling codes in total.

When transmitting a preamble, the user equipment randomly chooses one of the available signature codes, scrambles the signature with a preamble scrambling code, and transmits the resulting preamble at the beginning of a WCDMA Acquisition Indicator Channel (AICH) access slot. There are 15 access slots per two frames, and the slots are spaced 5,120 chips apart. The BTS typically does not know a priori which of the randomly chosen signature codes was used in constructing the preamble. Further, the BTS typically does not know the length of the propagation delay of the preamble (i.e., the delay between the time the preamble was transmitted and the time that the preamble is received) because the location of the user equipment within the cell in which the BTS resides is typically unknown to the BTS at the time a connection is requested.

Since the preamble is the first indication of the user equipment to the BTS, the BTS detects the user equipment by correlating antenna data at the beginning of each AICH access slot. PRACH preamble detection is typically performed by means of implementing a matched filter for each possible signature code in the subset of signature codes. In particular, the antenna data is correlated with all possible preambles for each signature code in the subset of signature codes and for each possible propagation delay for the cell. Although the particular preamble that was transmitted is not known a priori to the BTS, the BTS typically knows a priori all of the possible preambles that could have been transmitted. The result of these correlations is a correlation profile for each possible signature code, where each correlation profile has a number of values (herein referred to as "correlation profile values" or simply "profile values") that is equal to the number of possible delays. In other words, the total number of correlation profiles is equal to the number of possible signature codes and the total number of correlation profile values is equal to the number of possible signature codes times the number of possible delays. The correlation profile value for signature s and delay lag may be represented as shown in Equation (1):

$$\text{profile}(s, \text{lag}) = \left\| \sum_{i=0}^{L-1} sm_i c_{s,i} x_{i+lag} \right\| \quad (1)$$

where i is the chip index, L is the preamble length in chips (e.g., 4,096 chips), $sm_i$ is a chip of the scrambling code multiplied by $$e^{j(\frac{\pi}{4}+\frac{\pi}{2}k)}, c_{s,i}$$

is a chip of the signature code s, and $x_{i+lag}$ is a chip of antenna data corresponding to possible delay lag.

After all correlation profiles are generated, each correlation profile value is compared to a threshold to detect the signature code that was transmitted and one or more possible propagation delays between the user equipment and the BTS. Each of the one or more possible propagation delays corresponds to a different propagation path of the transmitted preamble. The one or more possible propagation delays may then be provided to a path searcher to detect the propagation delay of the propagation path that is received first in time. Discussions of preambles and preamble detection may be found in Third Generation Partnership Project (3GPP) Technical Specification (TS) 25.211 V9.1.0 (2009-12) "Physical Channels and Mapping of Transport Channels onto Physical Channels (FDD)," 3GPP TS 25.213 V9.1.0 (2009-12) "Spreading and Modulation (FDD)," and 3GPP TS 25.214 V9.2.0 (2010-03) "Physical Layer Procedures (FDD)," the teachings of all of which are incorporated herein by reference in their entirety.

When a relatively large number of signature codes are employed (e.g., all 16 Hadamard codes), separately performing the above-mentioned matched filter approach for each signature code becomes relatively computationally expensive. In this case, a more-efficient approach to detecting preambles may be employed that is based on the Fast Hadamard Transform. Such an approach is discussed in U.S. patent application Ser. No. 12/304,804, the teachings of which are incorporated herein by reference in their entirety.

As disclosed in U.S. patent application Ser. No. 12/304, 804, Equation (1) may be rewritten as shown in Equation (2):

$$\text{profile}(s, \text{lag}) = \left\| \sum_{r=0}^{15} c_{s,r} \sum_{l=0}^{L/16-1} sm_{16l+r} x_{16l+r+lag} \right\| \quad (2)$$

where i=16 l+r and r corresponds to one of the 16 bits in a signature sequence where r=0, . . . , 15. Equation (2) is derived from the fact that every signature s comprises 256 repetitions of a 16-bit sequence. As shown in Equation (2), the signature code $c_{s,r}$ is broken out into an outer-most summation. The inner-most summation is performed 16 times, once for each bit r of a 16-bit signature code sequence, to generate 16 partial sums. Essentially, Equation (2) divides the chips of antenna data x, and the corresponding chips of the scrambling code sm into 16 streams, each stream corresponding to a different bit r of a 16-bit signature code sequence. The chips of antenna data x are split up and assigned to 16 streams such that antenna data chips $x_0, x_1, \ldots, x_{15}$ are distributed to streams 0, 1, . . . , 15, respectively, antenna data chips $x_{16}, x_{17}, \ldots, x_{31}$ are distributed to streams 0, 1, . . . , 15, respectively, and so forth.

As a result of the signature code $c_{pre,s,r}$ being broken out into an outer-most summation, the inner-most summation is independent of the signature codes, and therefore, the 16 partial sums that result from the inner-most summation may be reused for all 16 signature codes. The correlation profiles for all 16 signatures are derived by multiplying the 16×16 Hadamard Matrix with the 16 partial sums from the inner summation as shown in Equation (2). Such calculation may be accelerated by using the Fast Hadamard Transformation.

SUMMARY OF THE INVENTION

In one embodiment, the present invention is a processor-implemented method for detecting a preamble in a data signal transmitted from a transmitter and received at the receiver. The method comprises processing a portion of a set of data to update a set of correlation profiles. Each correlation profile corresponds to a different possible preamble. A size of the set of data corresponds to a length of the preamble plus a specified maximum propagation delay, and a size of the portion is smaller than the size of the set of data. The method also comprises performing an intermediate preamble detection attempt corresponding to the portion to determine whether a correlation profile in the set of correlation profiles corresponds to the preamble. The intermediate preamble detection attempt is performed before processing all data in the set of data.

In another embodiment, the present invention is an apparatus adapted to detect a preamble in a data signal transmitted from a transmitter and received at the receiver. The apparatus comprises at least one processor adapted to perform the method described above.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 2 shows pseudo-code according to one embodiment of the present invention that may be used to implement the incremental preamble detection method of FIG. 1;

FIG. 4 shows pseudo-code according to one embodiment of the present invention that implements the incremental preamble detection method of FIG. 3;

DETAILED DESCRIPTION

Figure 1A:
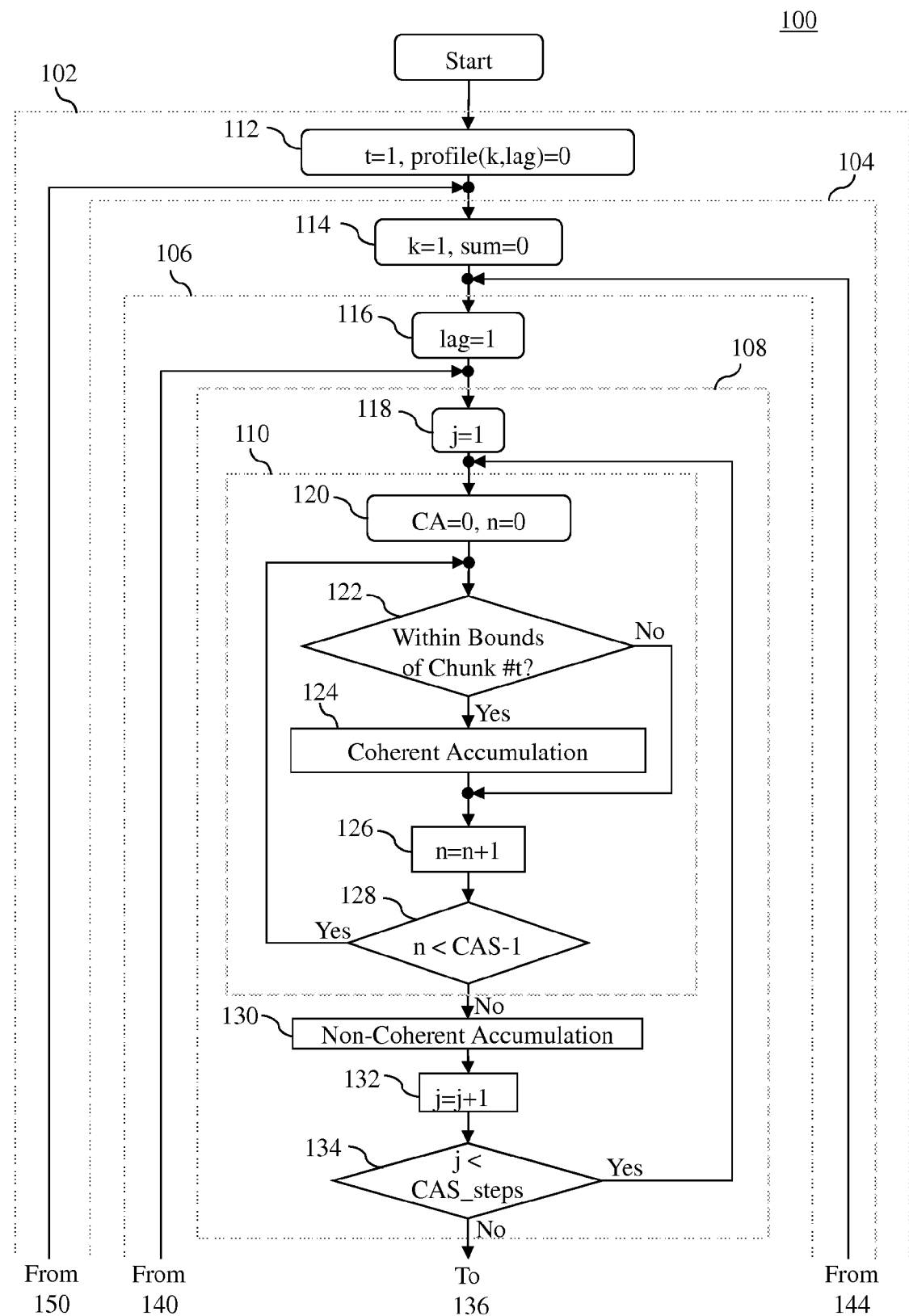
FIG. 1 shows a simplified flow diagram of an incremental preamble detection method according to one embodiment of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Conventional preamble detection methods, such as those described in the background, perform preamble decisions on a slot-by-slot basis. In other words, these conventional methods do not perform preamble decisions until after sufficient antenna data has been received to analyze an entire access slot. Thus, these methods accumulate a number of chips of antenna data that is equal to the preamble length (e.g., 4,096 chips) plus a maximum possible preamble delay for the cell (i.e., max_lag) before generating the correlation profiles and comparing the values of each correlation profile to a threshold.

The 3GPP standard prohibits the latency of the preamble detection operation from exceeding 7,680 chips. Thus, if the maximum delay for the cell is greater than 7,680 chips−4,096 chips=3,584 chips, which corresponds to a cell size of 3,584 chips/25.6=140 km, where 25.6 is the number of chips that travel 1 km round trip (i.e., 2 km) at the speed of light, then the latency requirements of the 3GPP standard cannot be met. As an alternative to performing preamble detection on a slot-by-slot basis, the present invention proposes methods for performing preamble detection on an incremental basis, where incremental preamble decisions are made before accumulating all 4,096+max_lag chips. According to these methods, preamble decisions are made for a limited delay range before all 4,096+max_lag chips are available.

To accommodate these incremental preamble decisions, methods and apparatuses of the present invention process non-overlapping chunks of the incoming antenna data, where each chunk has M chips of antenna data and M is less than 4,096+max_lag chips in length. Preferably, the chunk size is chosen to satisfy the latency requirements discussed above while at the same time satisfying memory and bandwidth limitations. In order to facilitate the incremental preamble decisions, partial correlation profiles are generated for each signature code. The partial correlation profiles are updated after each chunk of antenna data is processed, or after a specified number of chunks are processed, and incremental preamble decisions are made after each partial correlation profile is updated, or after a specified number of chunks are processed, by comparing the partial correlation profiles to an intermediate threshold. Upon receiving the final chunk, the partial correlation profiles are updated to generate final correlation profiles, and final preamble decisions may be made using the final correlation profiles by comparing the final correlation profiles to a final threshold.

Incremental Preamble Detection Using a Matched-Filter Approach

Figure 1B:
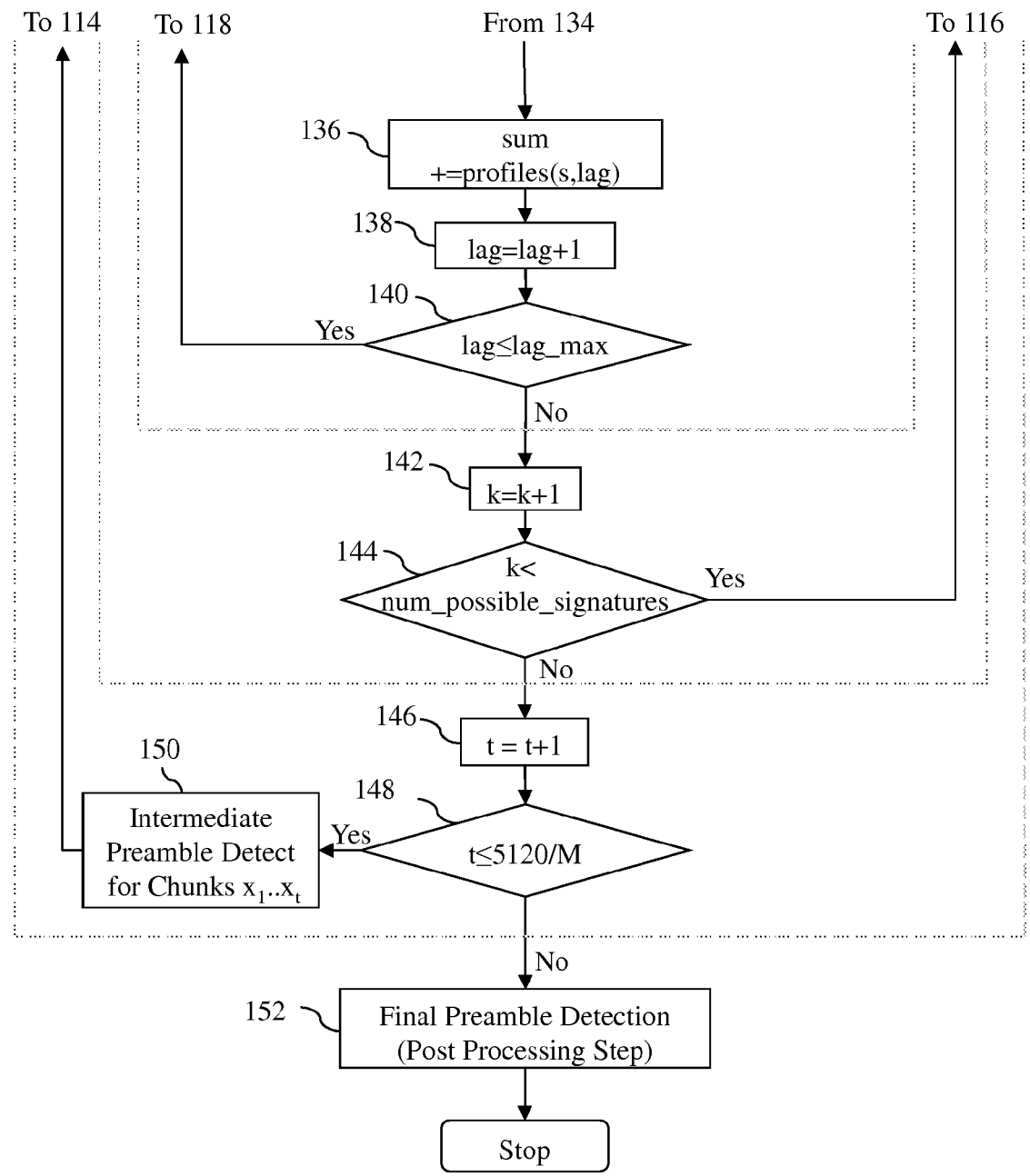

FIG. 1 shows a simplified flow diagram of an incremental preamble detection method 100 according to one embodiment of the present invention. Incremental preamble detection method 100 performs matched filtering analogous to the matched filtering described in the background (i.e., correlates antenna data with possible preambles for various signature codes and for possible propagation delays for the cell). However, rather than processing antenna data on a slot-by-slot basis, the antenna data is processed on a chunk-by-chunk basis, such that incremental preamble decisions are made after each chunk $x_t$ of antenna data is processed. For simplicity, suppose that each access slot is split into an integer number (e.g., 5,120/M) of antenna chunks $x_t$ (where 5,120 chips mod M chips=0, where "mod" denotes a modulo operation), where each chunk $x_t$ has M chips.

In general, preamble detection method 100, which is performed once for each access slot, updates a different correlation profile value profile(k,lag) for (i) each signature k in the subset of signatures employed by the system, where there are num_possible_signatures different possible signatures employed by the system, and (ii) each possible delay lag of the cell, where there are max_lag different possible delays of the cell. Note that the parameter s is used both as a counter for the different signatures as well as a short-hand notation for the $s^{th}$ signature. Those skilled in the art will understand which meaning to apply based on the context in which it appears. The same applies to the parameter lag. In the following discussion, the lag number corresponds to the number of chips delayed counting from the beginning of an access slot. For example, the $5^{th}$ lag corresponds to a delay of 5 chips. However, the present invention is not so limited. As described above, the 3GPP standard allows for up to 16 possible signature codes, commonly referred to as the 16 Hadamard codes; however, often, only a subset of the 16 possible signature codes is employed in a given system. As used herein, the variable s corresponds to a signature in the complete set of 16 signatures, while the variable k corresponds to a signature in a subset of the 16 signatures. For each signature k, the number of correlation profile values profile(k,lag) updated is equal to the maximum delay (max_lag) of the cell. Thus, preamble detection method 100 updates num_possible_signatures correlation profiles and num_possible_signatures×max_lag total profile values profile(k,lag).

Each time an antenna chunk $x_t$ is received, a subset of the num_possible_signatures×max_lag correlation profile values profile(k,lag) are updated. Specifically, the correlation profile values profile(k,lag) for a limited range of delays lag that correspond to the chips of the antenna chunk $x_t$ are updated. Each time a subset of profile values profile(k,lag) is updated, excluding the last update for the access slot, an intermediate preamble detection is performed by comparing the updated profile values profile(k,lag) to an intermediate threshold (herein represented as threshold1) in an attempt to detect the transmitted signature(s) k and the propagation delay(s) lag of the transmitted preamble(s). Note that methods of the present invention are capable of detecting more than one transmitted preamble for each antenna chunk $x_t$ processed. The intermediate threshold threshold1 is updated each time that the profile values profile(k,lag) are updated (i.e., each time an antenna chunk $x_t$ is processed), excluding the last time. The last time that the profile values profile(k,lag) are updated (i.e., upon processing the last antenna chunk $x_t$) for the access slot, a final preamble detection is performed by comparing the profile values profile(k,lag) to a final threshold (herein represented as threshold2). For purposes of this specification and the appended claims, the updated correlation profiles for the last update of an access slot are considered to be final correlation profiles, while the updated correlation profiles profile(k,lag) for all other updates of an access slot (i.e., other than the last) are considered to be partial correlation profiles.

The num_possible_signatures×max_lag profile values profile(k,lag) are updated using five nested loops 102, 104, 106, 108, and 110 in method 100 of FIG. 1. The following discussion provides a general explanation of the operation of the five nested loops, and a more-detailed explanation follows. First loop 102 is performed one time for each antenna chunk $x_t$ received in an access slot, beginning with antenna chunk t=1 (step 112). Each time first loop 102 is performed, a subset of the correlation profile values profile(k,lag) is updated and compared to a threshold (i.e., either intermediate threshold1 or final threshold2).

For each antenna chunk $x_t$, second loop 104 is performed numb_possible_signatures times, once for each signature k in the subset of signatures employed by the system, beginning with signature k=1 (step 114). Each time second loop 104 is performed, all of the correlation profile values profile(k,lag) are updated for one signature k (i.e., max_lag profiles) and all delays lag.

For each signature k employed, third loop 106 is performed max_lag times, once for each possible delay lag of the cell, beginning with lag=1 (step 116). Each time third loop 106 is performed, one correlation profile value profile(k,lag) for signature k and delay lag is updated.

For each signature k and each delay lag, chips of antenna chunk $x_t$ corresponding to delay lag are correlated with the corresponding chips of a possible preamble known a priori to the BTS to update the profile value profile(k,lag) for signature k and delay lag. Although the particular preamble that was transmitted is not typically known a priori to the BTS, the BTS typically knows a priori all of the possible preambles that could have been transmitted. It is the chips of one of these possible preambles that are correlated with the chips of antenna chunk $x_t$ in loops 108 and 110. This correlation operation is implemented using fourth loop 108, which performs non-coherent accumulation. Within Loop 108 is loop 110, which performs coherent accumulation. The coherent accumulation of loop 110 is performed multiple times, once for each chip in a coherent accumulation window, within each implementation of the non-coherent accumulation of loop 108.

The coherent accumulation of fifth loop 110 correlates non-overlapping windows j (also referred herein as "coherent accumulation windows") of chips from antenna chunk $x_t$ with corresponding chips $c_{pre}(i)$ of the known preamble to generate a coherent accumulation value CA for each coherent accumulation window j. Preferably, the number CAS of chips of antenna data in each coherent accumulation window j divides the total number M of chips in an antenna chunk $x_t$ without remainder so that there are an integer number of windows j in an antenna chunk $x_t$. Note that the term "coherent accumulation window" refers to sliding windows of antenna data, wherein the particular chips of antenna data within each window varies from one delay to the next. For example, the first "coherent accumulation window" for a delay of zero begins with the first chip of antenna data received, the first "coherent accumulation window" for a delay of one begins with the second chip of antenna data received, and so forth. The term "antenna chunk $x_t$", on the other hand, refers to non-sliding windows of antenna data, wherein the particular chips of antenna data within each chunk does not vary from one delay to the next.

The non-coherent accumulation of fourth loop 108 combines the coherent accumulation values CA corresponding to coherent-accumulation windows j to update the profile value profile(k,lag) for the signature k and propagation delay lag. Note that, according to alternative embodiments, the present invention may be implemented using a single window j of antenna chips that is equal in number to the number M of chips in an antenna chunk $x_t$ (i.e., CAS=M). In such embodiments, the correlation operation is performed using a single coherent accumulation step, thereby eliminating the need for the non-coherent accumulation step.

Referring now to the detailed operation of preamble detection method 100. Upon startup, the first antenna chunk $x_t$ is received (step 112), where t=1. Signature k, which ranges from k=1, num_possible_signatures, and delay lag, which ranges from lag=1, ..., max_lag, are both initiated to one (steps 114 and 116, respectively) such that the first correlation profile value profile(k,lag) to be generated is profile(1,1). In step 118, the coherent accumulation window index j, which ranges from j=1, . . . , the number of coherent accumulation steps (num_CAS_steps), is initialized to one. In step 120, an index value n of the chip within coherent accumulation window j (i.e., relative to the beginning of window j), which ranges from n=0, . . . , CAS-1, is set equal to zero, and the coherent accumulation value CA for the current window j is set to zero.

Coherent accumulation within window j is performed using steps 122, 124, 126, and 128. In particular, decision 122 is performed to determine whether or not the current chip n of antenna data is within the bounds of chunk $x_t$. This is accomplished by determining an absolute index i of current chip n relative to the beginning of the preamble pattern as shown in Equation (3) as follows:

$$i=(j-1)\times CAS+n \tag{3}$$

The absolute index i is then used to determine an index i0 for chip n relative to the beginning of chunk t as shown in Equation (4) as follows:

$$i0=lag+i-(t-1)\times M \tag{4}$$

If index i0 is greater than or equal to zero and less than M (i.e., $0 \le i0 < M$), then the current chip is within the bounds of chunk $x_t$. In this case, coherent accumulation is performed (step 124) to update coherent accumulation value CA as shown in equation (5) below:

$$CA+=x_t(i0)\times c_{pre}(i) \tag{5}$$

where $x_t(i0)$ is the chip of antenna data, $c_{pre}(i)$ is the corresponding chip from the preamble pattern known a priori by the BTS, and the symbol "+=" indicates that $x_t(i0) \times c_{pre}(i)$ is added to the previous coherent accumulation value CA to generate the updated coherent accumulation value CA. Each chip i of the preamble code $C_{pre}$ may be represented as shown in Equation (6):

$$c_{pre}(i) = S_{pre}(i) \times C_{sig,k}(i) \times e^{j(\frac{\pi}{4}+\frac{\pi}{2}i)} \tag{6}$$

where $S_{pre}(i)$ is a chip of the preamble scrambling code and $C_{sig,k}(i)$ is a chip of the signature code k.

After updating coherent accumulation value CA (step 124), or in the event that the current chip n is not within the bounds of chunk $x_t$ (decision 122), the next chip is selected (step 126). The index value n of the next chip is compared (decision 128) to CAS-1, where CAS is the number of chips in each coherent accumulation window j, to determine whether or not the next chip is within the boundaries of coherent accumulation window j (i.e., $0 \le n < CAS-1$). If the next chip is within the boundaries of coherent accumulation window j, then processing returns to decision 122 for the next chip. If, on the other hand, the next chip is not within the boundaries of coherent accumulation window j, then non-coherent accumulation is performed (step 130) to update correlation profile value profile(k,lag) as shown in Equation (7) below:

$$profile(k,lag)+=abs(CA) \tag{7}$$

Note that, the bounds checking of step 122 ensures that all data addressing is performed correctly and only the correlation profile values profile(k,lag) for delays lag that correspond to the current chunk $x_t$ are updated.

In step 132, the next coherent accumulation window j is selected. Decision 134 is performed to determine whether or not the next coherent accumulation window j should be non-coherently accumulated to profile value profile(k,lag) by comparing the index value j for the next coherent accumulation window to CAS_steps, which is the total number of coherent accumulation windows processed for each update of correlation profile value profile(k,lag) and is equal to the number M of chips in chunk $x_t$ divided by the number CAS of chips in a coherent accumulation window j (i.e., CAS_steps=M/CAS). Preferably, as described above, CAS divides M without remainder such that the total number CAS_steps of coherent accumulation windows is an integer number.

If the next coherent accumulation window j is to be processed for correlation profile value profile(k,lag) (decision 134), then processing returns to step 120 for the next coherent accumulation window j. If, on the other hand, the next coherent accumulation window j is not to be processed for correlation profile value profile(k,lag), then a value sum, which is initialized to zero in step 114, is updated (step 136) as shown in Equation (8):

$$sum+=profile(k,lag) \tag{8}$$

Note that, as described above, the bounds checking of step 122 ensures that only the correlation profile values profile(k, lag) for delays lag that correspond to the current chunk $x_t$ are updated. Thus, for each correlation profile value profile(k, lag) that is not updated, the value of the previous correlation profile value profile(k,lag) is used in generating the value sum.

For all antenna chunks $x_t$, other than the last, each updated value sum is used to update intermediate threshold threshold1 as discussed below in relation to step 150. For the last antenna chunk $x_t$, the updated value sum is used to generate final threshold threshold2 as discussed below in relation to step 152.

After updating the value sum, the next delay lag is selected (step 138). Decision 140 is made to determine whether or not the next delay lag is to be processed for the current signature k. If the next delay lag is less than or equal to max_lag, then processing returns to step 118 to generate another correlation profile value profile(k,lag) for the current signature k and the next delay lag.

If, on the other hand, the next delay lag is greater than or equal to max_lag, then the next signature k is selected (step 142). Decision 144 is performed to determine whether or not the next signature k is within the maximum number of possible signatures employed by the system (i.e., num_possible_signatures). If the next signature k is within num_possible_signatures, then processing returns to step 116 for the next signature k. If, on the other hand, the next signature k is not within num_possible_signatures, then the chunk index t is incremented by one (step 146), and decision 148 is performed to determine whether or not the next antenna chunk $x_t$ is within the current access slot being considered. In particular, decision 148 compares the index t of the next antenna chunk $x_t$ to the slot size (i.e., 5,120 chips) divided by the number M of chips in a chunk $x_t$.

If index t is less than or equal to 5,120/M, then an intermediate preamble detection is performed for chunk $x_t$ (step 150) for a limited range of delays min_lag1(t), . . . , max_lag1(t) that may be determined heuristically, where min_lag1(t) and max_lag1(t) are the minimum and maximum delays of the range corresponding to chunk $x_t$, respectively. Note that min_lag1(t) and max_lag1(t) may vary with each chunk $x_t$. For a given chunk $x_t$, this range preferably corresponds to those delays lag for which correlation profile values profile (k,lag) are updated.

To perform intermediate preamble detection step 150, an intermediate threshold is calculated as shown in Equation (9) below:

$$\text{threshold1} = C1 \times \text{sum}/((\text{max\_lag1}(t) - \text{min\_lag1}(t) + 1) \times \text{num\_possible\_signatures}) \quad (9)$$

where C1 is a constant that may be determined heuristically. The correlation profile values profile(k,lag) for signatures k=1, ..., num_possible_signatures and delays lag=min_lag1(t), ..., max_lag1(t) are compared to intermediate threshold threshold1. If a profile value profile(k,lag) is greater than threshold1, then the corresponding signature k is a detected signature and the corresponding delay lag is a detected delay. Note that, for a single transmitted preamble, more than one profile value profile(k,lag) may be greater than threshold1. Typically, in such a case, the profile values that exceed threshold1 will correspond to the same signature k but different possible delays lag, where each of the possible delays lag corresponds to a different propagation path of the transmitted preamble. The one or more possible propagation delays may then be provided to a path searcher to detect the propagation delay of the propagation path that is received first in time. In some cases, a misdetection may occur where two or more profile values corresponding to different signatures k may exceed threshold1. However, according to the 3GPP standards, such misdetection should be relatively infrequent.

According to preferred embodiments of the present invention, processing continues until the earlier of (i) a maximum allowable latency being met or (ii) all chunks of data being processed for the current access slot. If the maximum allowable latency is not met, then processing returns to step 114. Once processing is stopped, the detected delays lag are provided to a path searcher to detect the propagation delay of the propagation path that is received first in time. According to alternative embodiments of the present invention, triggers other than the maximum allowable latency may be used to stop processing.

If index t is greater than 5,120/M, indicating that the next antenna chunk $x_t$ is not within the current access slot, then a final preamble detection step 152 is performed. To perform final preamble detection step 152, a final threshold is calculated as shown in Equation (10) below:

$$\text{threshold2} = C2 \times \text{sum}/(\text{max\_lag} \times \text{num\_possible\_signatures}) \quad (10)$$

where C2 is a constant, typically different from constant C1, that may be determined heuristically. Typically, C2>C1. The profile values profile(k,lag) for all signatures employed k=1, ..., num_possible_signatures and all delays lag=1, ..., max_lag are compared to final threshold threshold2. If one of the correlation profile values profile(k,lag) is greater than threshold2, then the corresponding signature k is a detected signature and the corresponding delay lag is a detected delay. Processing for the current access slot is then stopped.

FIG. 2 shows pseudo-code 200 according to one embodiment of the present invention that may be used to implement the incremental preamble detection method of FIG. 1. Pseudo-code 200 is divided into four parts. The first part, which occupies lines 1 through 9, initializes many of the parameters described above. The second part, which occupies lines 11 through 29, updates, for each antenna chunk $x_t$, the correlation profile values profile(k,lag) for all signatures k and delays lag, and the value sum which is used to calculate intermediate threshold threshold1 and final threshold threshold2. The third part, which occupies lines 31 through 45, performs intermediate preamble detection for each antenna chunk $x_t$, except for the last antenna chunk $x_t$. The fourth part, which occupies lines 47 through 56, performs the final preamble detection for the last antenna chunk $x_t$.

Incremental Preamble Detection Using the Fast Hadamard Transform

Figure 3A:
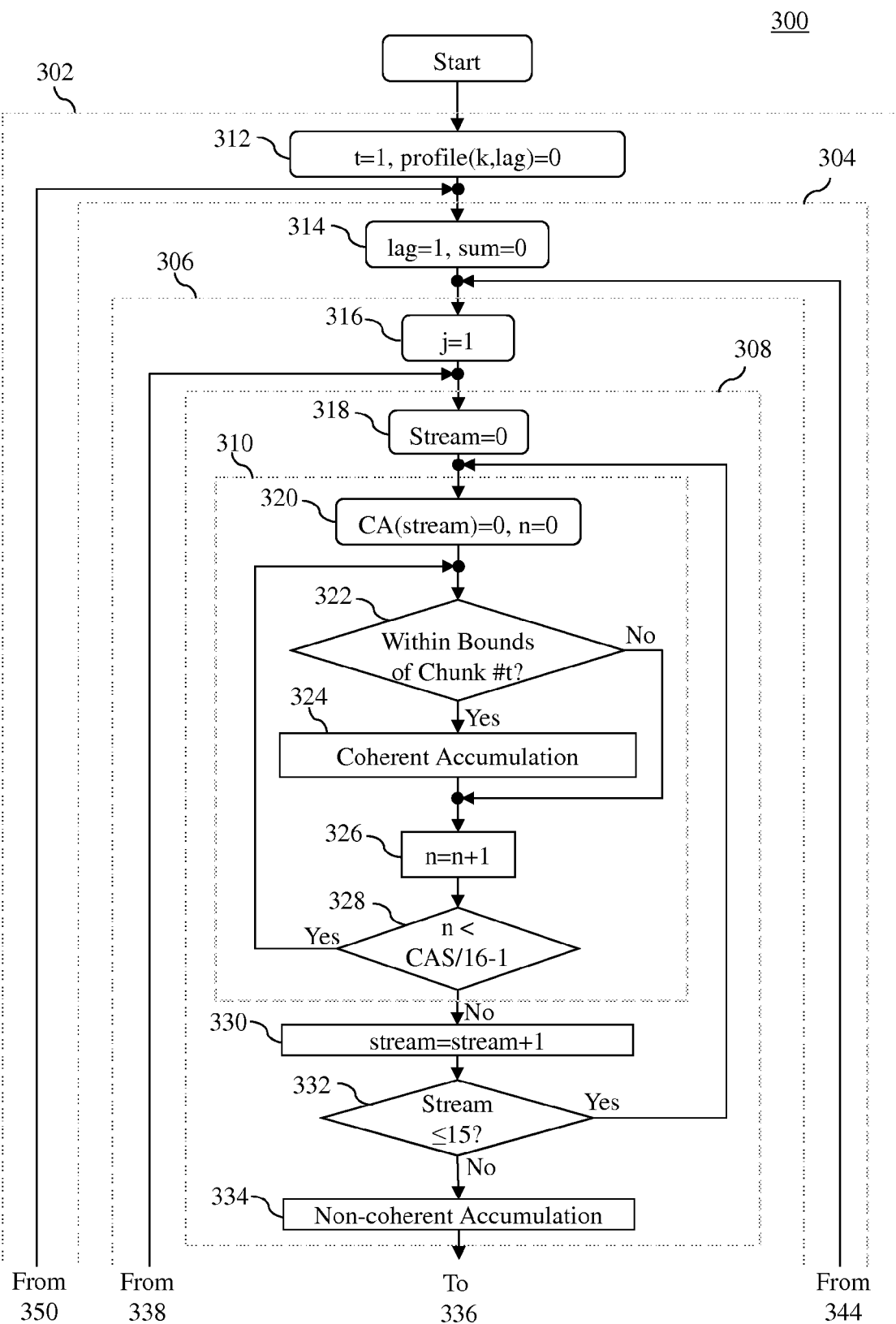
FIG. 3 shows a simplified flow diagram of an incremental preamble detection method according to one embodiment of the present invention that uses the Fast Hadamard Transform.
Figure 3B:
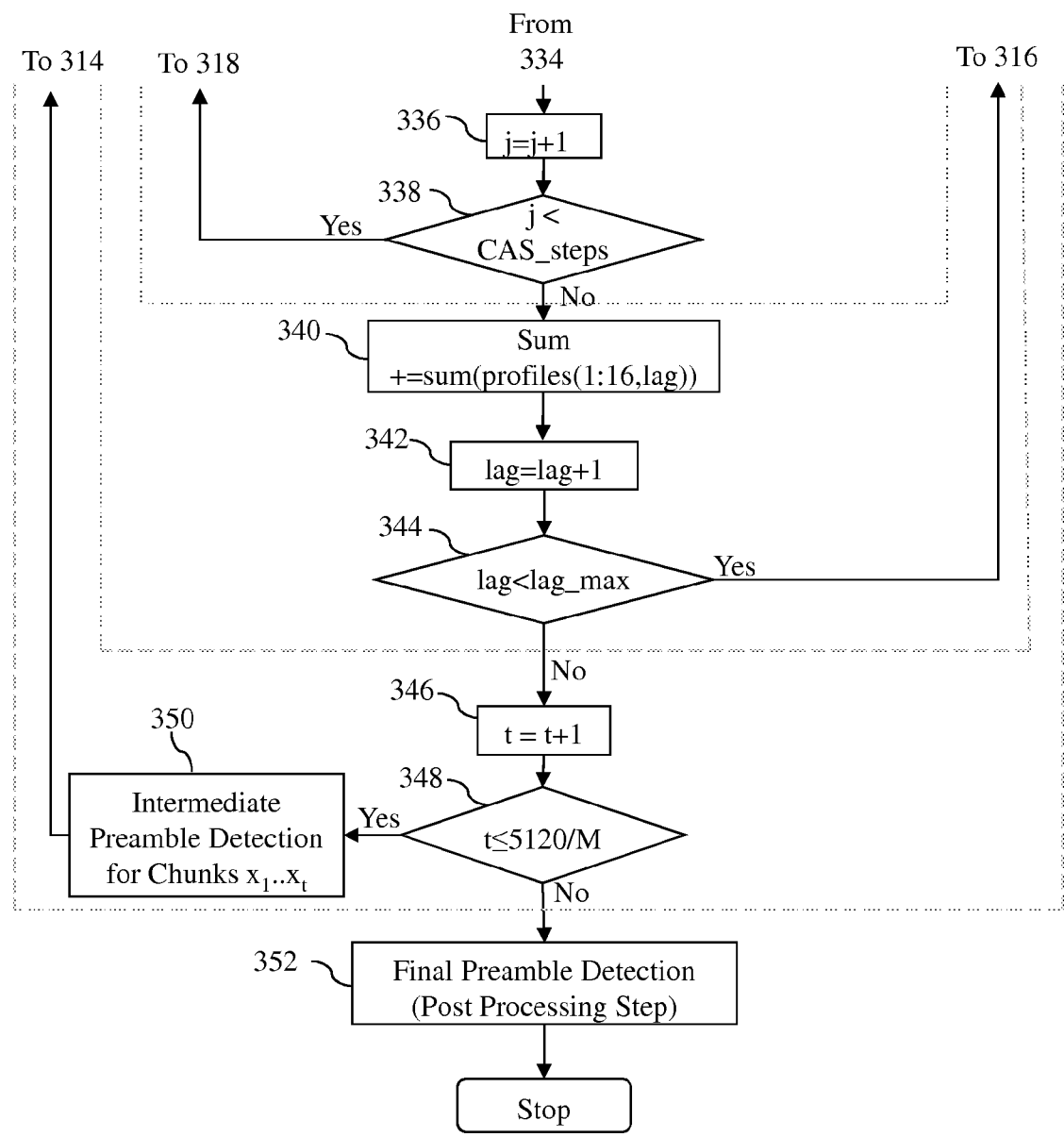

FIG. 3 shows a simplified flow diagram of an incremental preamble detection method 300 according to one embodiment of the present invention that uses the Fast Hadamard Transform. Similar to preamble detection method 100, method 300 processes antenna data on a chunk-by-chunk basis, such that incremental preamble decisions are made after each chunk $x_t$ of antenna data is processed. As above, for simplicity, suppose that each access slot is split into an integer number (5,120/M) of antenna chunks $x_t$ (where 5,120 chips mod M chips=0, where "mod" denotes a modulo operation), where each chunk $x_t$ has M chips.

In general, preamble detection method 300, which is performed once for each access slot, updates a different correlation profile value profile(s,lag) for (i) each signature s, where s=1, ..., 16, and (ii) each possible delay lag of the cell, where lag=1, ..., max_lag. For each signature s, the number of correlation profile values profile(s,lag) updated is equal to the maximum delay (max_lag) of the cell. Thus, preamble detection method 300 updates 16×max_lag total correlation profile values profile(s,lag).

Each time an antenna chunk $x_t$ is received, a subset of the 16×max_lag correlation profile values profile(k,lag) are updated. Specifically, the correlation profile values profile(k,lag) for a limited range of delays lag that correspond to the chips of the antenna chunk $x_t$ are updated. Each time a subset of profile values profile(s,lag) is updated, excluding the last update for the access slot, an intermediate preamble detection is performed by comparing the updated profile values profile(k,lag) to an intermediate threshold (herein represented as threshold3) in an attempt to detect the transmitted signature s and the propagation delay of the transmitted preamble. The intermediate threshold threshold3 is updated each time that the profile values profile(s,lag) are updated, except for the last time. The last time that the profile values profile(s,lag) are updated (i.e., upon receiving the last chunk x) for the access slot, a final preamble detection is performed by comparing the profile values profile(s,lag) to a final threshold (herein represented as threshold4). As described above, for purposes of this specification and the appended claims, the updated correlation profiles for the last update of an access slot are considered to be final correlation profiles, while the updated correlation profiles for all other updates of an access slot (i.e., other than the last) are considered to be partial correlation profiles.

In general, preamble detection method 300 updates the correlation profile values profile(s,lag) using five nested loops 302, 304, 306, 308, and 310. In general, first loop 302 is performed one time for each antenna chunk $x_t$ received in an access slot, beginning with antenna chunk t=1 (step 312), and each time first loop 302 is performed, a subset of the correlation profile values profile(s,lag) is updated and compared to a threshold (i.e., either intermediate threshold3 or a final threshold4). For each antenna chunk $x_t$, second loop 304 is performed max_lag times, once for each possible delay lag, beginning with delay lag=1 (step 314). Each time second loop 304 is performed, the correlation profile values profile(s,lag) for all 16 signatures s and delay lag (i.e., 16 profiles) are updated.

Similar to preamble detection method 100, preamble detection method 300 has coherent accumulation (i.e., fifth loop 310) and non-coherent accumulation (i.e., third loop 306). However, unlike preamble detection method 100, method 300 divides the chips of antenna data into 16 streams (stream(1:16)) in a manner similar to that described above in relation to Equation (2), such that antenna data chips $x_0, x_1, \ldots, x_{15}$ are distributed to streams $0, 1, \ldots, 15$, respectively, antenna data chips $x_{16}, x_{17}, \ldots, x_{31}$ are distributed to streams $0, 1, \ldots, 15$, respectively, and so forth.

For each coherent accumulation window j, 16 coherent accumulation values CA(stream) are updated, one for each of the 16 streams (i.e., fourth loop 308). Each coherent accumulation value CA(stream) is generated by correlating chips from the corresponding stream of antenna data with corresponding chips of the scrambling code. Note that, similar to Equation (2) above, the chips of the signature codes are not used in this calculation. Therefore, the coherent accumulation values CA(stream) are independent of the signature codes, and are reused in fourth loop 308 to generate correlation profile values profile(s,lag) for all 16 signature codes s using the Fast Hadamard Transform. Note also that, for each antenna chunk $x_t$, only those chips in the antenna chunk $x_t$ are used in generating the coherent accumulation values CA(stream). This is in contrast to Equation (2), which does not process the antenna data in chunks.

Referring now to the detailed operation of preamble detection method 300. Upon startup, the first antenna chunk $x_t$ is received (step 312), where t=1. Delay lag, which ranges from lag=1, . . . , max_lag, and the coherent accumulation window index j, which ranges from j=1, . . . , the number of coherent accumulation steps (num_CAS_steps), are both initiated to one (steps 314 and 316, respectively) such that the first 16 correlation profile values profile(k,lag) to be generated are profiles profile(1,1) to profile(16,1). In step 318, the first stream is selected, where stream=0, . . . , 15. In step 320, the index value n of the chip within coherent accumulation window j (i.e., relative to the beginning of window j), which ranges from n=0, . . . , CAS/16-1, is set equal to zero, and the coherent accumulation value CA(stream) for the current stream is set to zero.

Coherent accumulation within window j=1 and for stream is performed using steps 322, 324, 326, and 328. In particular, decision 322 is performed to determine whether or not chip n of antenna data is within the bounds of chunk $x_t$. This accomplished by determining an absolute index i of chip n relative to the beginning of the preamble pattern as shown in Equation (11) as follows:

$$i=(j-1)\times(CAS/16)+n \quad (11)$$

The absolute index i is then used to determine an index i0 for chip n relative to the beginning of chunk t as shown in Equation (12) as follows:

$$i0=\text{lag}+i\times 16+\text{stream}-(t-1)\times M \quad (12)$$

If index i0 is greater than or equal to zero and less than M (i.e., $0 \leq i0 < M$), then chip n is within the bounds of chunk $x_t$. In this case, coherent accumulation is performed (step 324) to update coherent accumulation value CA(stream) as shown in equation (13) below:

$$CA(\text{stream})+=x_t(i0)\times S_{pre}(i\times 16+\text{stream}) \quad (13)$$

where $x_t(i0)$ is the chip of antenna data, $S_{pre}(i\times 16+\text{stream})$ is the corresponding chip from the scrambling code, and the symbol "+=" indicates that $x_t(i0)\times S_{pre}(i\times 16+\text{stream})$ is added to the previous coherent accumulation value CA(stream) to generate the updated coherent accumulation value CA(stream). Each chip i of the scrambling code $S_{pre}$ may be represented as shown in Equation (14):

$$S_{pre}(i) = C_{long}(i) \times e^{j(\frac{\pi}{4}+\frac{\pi}{2}i)} \quad (14)$$

where $C_{long}(i)$ is a chip of the long scrambling code and i=0, . . . , 4,095.

After updating coherent accumulation value CA(stream) (step 324), or in the event that the current chip is not within the bounds of chunk $x_t$ (decision 322), the next chip is selected (step 326). The index value n of the next chip is compared to CAS/16-1 (decision 328), where CAS is the number of chips in each coherent accumulation window j, to determine whether or not the next chip is within the boundaries of coherent accumulation window j. If the next chip is within the boundaries of coherent accumulation window j, then processing returns to decision 322 for the next chip.

If, on the other hand, the next chip is not within the boundaries of coherent accumulation window j, then the stream index number stream is incremented by one (step 330), and the next stream index number is compared to 15 (decision 332) to determine whether or not the coherent accumulation value CA(stream) for the next stream is to be updated. If the coherent accumulation value CA(stream) for the next stream is to be updated, then processing returns to step 320 for the next stream. If the next stream exceeds 15, then non-coherent accumulation is performed (step 334) to concurrently update 16 correlation profile values profile(s,lag) corresponding to signatures s=1, . . . , 16 and the current delay lag as shown in Equation (15) below:

$$\text{profile}(1:16,\text{lag})+=\text{abs}(H\times CA) \quad (15)$$

where H is the 16×16 Hadamard matrix. Note that the bounds checking of step 322 ensures that only the correlation profile values profile(k,lag) for delays lag that correspond to the current chunk $x_t$ are updated.

In step 336, the next coherent accumulation window j is selected. Decision 338 is performed to determine whether or not the next coherent accumulation window j should be non-coherently accumulated to profile values profile(1:16,lag) by comparing the index value j for the next coherent accumulation window to CAS_steps, which is the total number of coherent accumulation windows processed for each update of correlation profile values profile(1:16,lag) and is equal to the number M of chips in chunk $x_t$ divided by the number CAS of chips in a coherent accumulation window j (i.e., CAS_steps=M/CAS). Preferably, as described above, CAS divides M without remainder such that the total number CAS_steps of coherent accumulation windows is an integer number.

If the next coherent accumulation window j is to be processed for correlation profiles profile(1:16,lag) (decision 338), then processing returns to step 318 for the next coherent accumulation window j. If, on the other hand, the next coherent accumulation window j is not to be processed for correlation profile value profile(k,lag), then a value sum, which may be initialized to zero, is updated (step 340) by adding all 16 correlation profiles to the previous value sum as shown in Equation (16):

$$\text{sum}+=\text{sum}(\text{profile}(s,\text{lag}),s=1,\ldots,16) \quad (16)$$

Note that, as described above, the bounds checking of step 322 ensures that only the correlation profile values profile(k,lag) for delays lag that correspond to the current chunk $x_t$ are updated. Thus, for each correlation profile value profile(k,lag) that is not updated, the value of the previous correlation profile value profile(k,lag) is used in generating the sum value.

For all antenna chunks $x_t$, other than the last, each updated value sum is used to update intermediate threshold threshold3 as discussed below in relation to step 350. For the last antenna chunk $x_t$, the updated value sum is used to generate final threshold threshold4 as discussed below in relation to step 352.

After updating the value sum, the next delay lag is selected (step 342). Decision 344 is made to determine whether or not the next delay lag is to be considered. If the next delay lag is less than or equal to max_lag, then processing returns to step 318 to generate another 16 correlation profile values profile (1:16,lag) for the next delay lag. If, on the other hand, the next delay lag is greater than max_lag, then the next antenna chunk $x_t$ is selected (step 346), and decision 348 is performed to determine whether or not the next antenna chunk $x_t$ is within the current access slot being considered. In particular, decision 348 compares the index t of the next antenna chunk $x_t$ to the slot size (i.e., 5,120 chips) divided by the number M of chips in a chunk $x_t$.

If index t is less than or equal to 5,120/M, then an intermediate preamble detection is performed for chunk $x_t$ (step 350) for a limited range of delays min_lag1(t), . . . , max_lag1(t) that may be determined heuristically, where min_lag1(t) and max_lag1(t) are the minimum and maximum delays of the range corresponding to chunk $x_t$, respectively. To perform intermediate preamble detection step 150, an intermediate threshold is calculated as shown in Equation (17) below:

$$\text{threshold3}=C3 \times \text{sum}/((\text{max\_lag1}(t)-\text{min\_lag1}(t)+1) \times 16) \quad (17)$$

where C3 is a constant that may be determined heuristically. Note that min_lag1(t) and max_lag1(t) may vary with each chunk $x_t$. For a given chunk $x_t$, this range preferably corresponds to those delays lag for which correlation profile values profile(k,lag) are updated.

The correlation profile values profile(s,lag) for signatures s=1, . . . , 16 and delays lag=min_lag1(t), . . . , max_lag1(t) are compared to intermediate threshold threshold3. If a profile value profile(s,lag) is greater than threshold3, then the corresponding signature s is a detected signature and the corresponding delay lag is a detected delay. Note that, for a single transmitted preamble, more than one profile value profile(k, lag) may be greater than threshold3. Typically, in such a case, the profiles that exceed threshold3 will correspond to the same signature k but different possible delays lag, where each of the possible delays lag corresponds to a different propagation path of the transmitted preamble. The one or more possible propagation delays may then be provided to a path searcher to detect the propagation delay of the propagation path that is received first in time. In some cases, a misdetection may occur where two or more profiles corresponding to different signatures k may exceed threshold3. However, according to the 3GPP standards, such misdetection should be relatively infrequent.

According to preferred embodiments of the present invention, processing continue until the earlier of (i) a maximum allowable latency being met or (ii) all chunks of data being processed for the current access slot. If the maximum allowable latency is not met, then processing returns to step 314. Once processing is stopped, the detected delays lag are provided to a path searcher to detect the propagation delay of the propagation path that is received first in time. According to alternative embodiments of the present invention, triggers other than the maximum allowable latency may be used to stop processing.

If index t is greater than 5,120/M, indicating that the next antenna chunk $x_t$ is not within the current access slot, then a final preamble detection step 352 is performed. To perform final preamble detection step 352, a final threshold is calculated as shown in Equation (18) below:

$$\text{threshold4}=C4 \times \text{sum}/(\text{max\_lag} \times 16) \quad (18)$$

where C4 is a constant, typically different from constant C3, that may be determined heuristically. The profile values profile(s,lag) for all signatures employed s=1, . . . , 16 and all delays lag=1, . . . , max_lag are compared to final threshold threshold4. If a correlation profile value profile(s,lag) is greater than threshold4, then the corresponding signature s is a detected signature and the corresponding delay lag is a detected delay. Processing for the current access slot is then stopped.

FIG. 4 shows pseudo-code 400 according to one embodiment of the present invention that implements the incremental preamble detection method of FIG. 3. Similar to pseudo-code 200, pseudo-code 400 is divided into four parts. The first part, which is on lines 1 through 10, initializes many of the parameters described above. The second part, which is on lines 12 through 29, updates, for each antenna chunk $x_t$, the correlation profile values profile(s,lag) for all signatures s and delays lag, and the value sum which is used to calculate intermediate threshold threshold3 and final threshold threshold4. The third part, which is on lines 31 through 45, performs intermediate preamble detection for each antenna chunk $x_t$, except for the last antenna chunk $x_t$. The fourth part, which is on lines 47 through 56, performs the final preamble detection for the last antenna chunk $x_t$.

Concurrent Incremental Preamble Detection for Two Scrambling Codes

When a preamble is transmitted during one access slot from user equipment that is greater than 40 km from the receiving base station, a part of the preamble (i.e., the preamble tail) may be received by the base station during the next access slot. This is due to the fact that each PRACH access slot is 5,120 chips in length, and each PRACH preamble is 4,096 chips in length. Thus, each slot has an allowable propagation delay of 5,120-4,096=1,024 chips, which corresponds to a distance of 40 km. A delay greater than 1,024 chips typically will result in the preamble tail being received by the base station during the next access slot.

Since each access slot may contain a tail from a previous preamble, it is preferred that each chunk of antenna data be processed twice, once to detect a preamble transmitted during the current access slot and once to determine detect a tail from a preamble transmitted during the previous access slot. Note that, typically, subsequent preambles are transmitted using different scrambling codes. Thus, each antenna chunk is processed based on two different scrambling codes.

Figure 5:
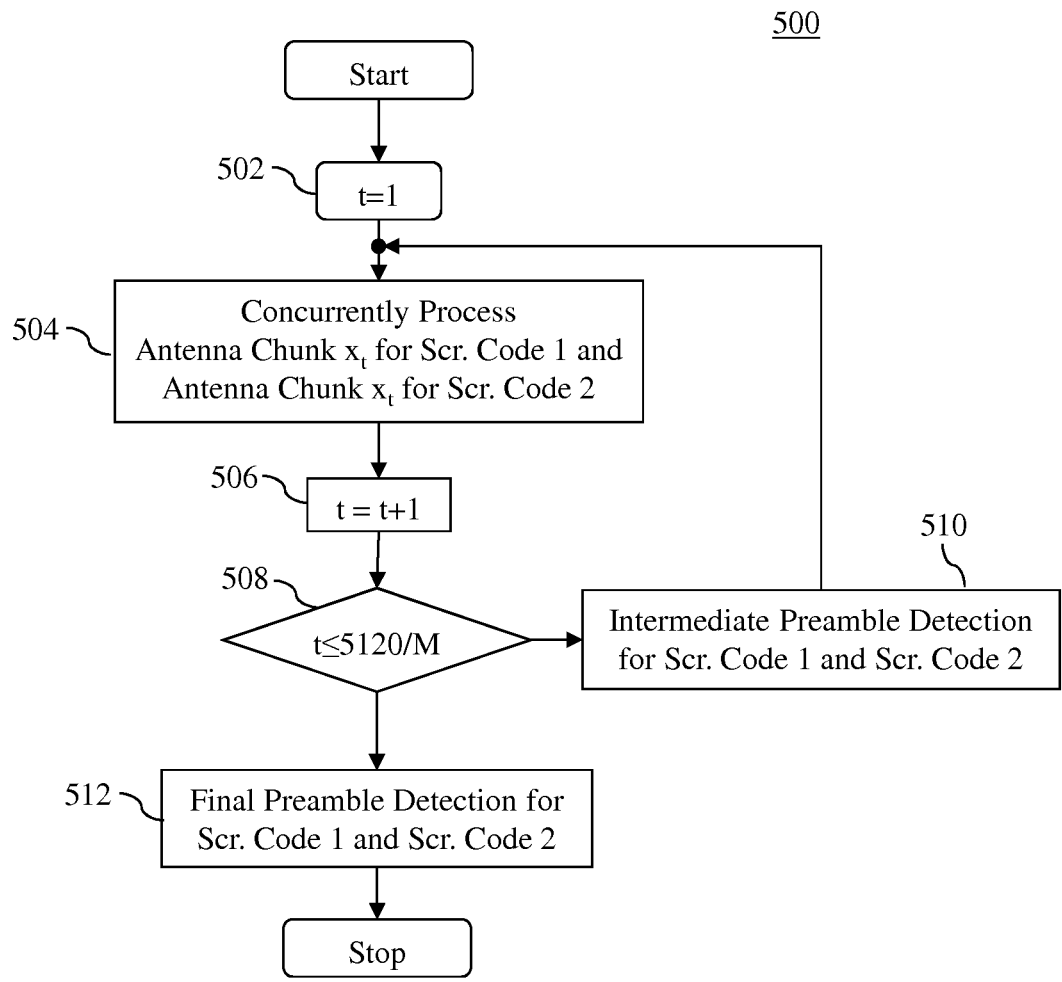
FIG. 5 shows a simplified flow diagram of an incremental preamble detection method according to one embodiment of the present invention that processes each chunk of antenna data twice.

FIG. 5 shows a simplified flow diagram of an incremental preamble detection method 500 according to one embodiment of the present invention that processes each chunk of antenna data twice. Upon receiving the first chunk $x_t$ of antenna data, where t=1 (step 502), the chunk $x_t$ is processed twice, once using a first scrambling code and once using a second scrambling code (step 504). Processing for the first and second scrambling codes is preferably performed concurrently. Further processing for each of the first and second scrambling codes may be performed using a matched-filter approach similar to that discussed above in relation to nested loops 104 to 110 of FIG. 1 or using a Fast Hadamard Transform approach similar to that discussed above in relation to nested loops 304 to 310 of FIG. 3 to update the correlation profiles. Note that, for the matched-filter approach, index i discussed above in relation to Equation (3) will remain the same for the first scrambling code but will be changed as shown in Equation (19) below for the second scrambling code:

$$i=(j-1) \times CAS+n+5120 \quad (20)$$

Similarly, for the Fast Hadamard Transform approach, index i discussed above in relation to Equation (11) will remain the same for the first scrambling code but will be changed as shown in Equation (21) for the second scrambling code:

$$i=(j-1) \times (CAS/16)+n+5120/16 \quad (21)$$

Once correlation profile updating has been performed, the chunk index t is incremented by one (step 506), and decision 508 is performed to determine whether or not the next antenna chunk $x_t$ is within the current access slot being considered. In particular, decision 508 compares the index t of the next antenna chunk $x_t$ to the slot size (i.e., 5,120 chips) divided by the number M of chips in a chunk $x_t$.

If index t is less than or equal to 5,120/M, then an intermediate preamble detection is performed for chunk $x_t$ (step 510) for a limited range of delays min_lag1, . . . , max_lag1 that may be determined heuristically. Step 510 may be performed in a manner similar to that described above in relation to steps 150 of FIGS. 1 and 350 of FIG. 3. If index t is greater than 5,120/M, then a final preamble detection is performed for chunk $x_t$ (step 512). Step 512 may be performed in a manner similar to that described above in relation to steps 152 of FIGS. 1 and 352 of FIG. 3.

It can be shown that, for chunk-based processing, when the maximum delay max_lag plus the chunk size is less than 5,120 chips (i.e., the cell size<200-M/25.6), each chunk can be processed for two different scrambling codes concurrently with a complexity that is not greater than the processing for a signal scrambling code. For example, suppose that the chunk size M=1,024 chips and the cell size is equal to 200-1,024/25.6=160 km (4,096 chips). Table I shows an exemplary updating of profiles when two scrambling codes are processed concurrently.

TABLE I

Exemplary updating of profiles for two scrambling codes

| Antenna | Previous slot | | Current slot | | Memory usage, | Processing power |
|---|---|---|---|---|---|---|
| Chunk t | min_delay | max_delay | min_delay | max_delay | profile lags | needed, profile lags |
| 0 | 1024 | 4096 | 0 | 1024 | 4096 | 3072 |
| 1 | 2048 | 4096 | 0 | 2048 | 4096 | 3072 |
| 2 | 3072 | 4096 | 0 | 3072 | 4096 | 3072 |
| 3 | — | — | 0 | 4096 | 4096 | 3584 |
| 4 | — | — | 0 | 4096 | 4096 | 3584 |

As shown in Table I, for antenna chunk $x_t$, where t=0, the profile values for delays lag=1,024 to 4,096 are updated and stored for the previous slot corresponding to a first scrambling code, and the profile values for delays lag=0 to 1,024 are updated and stored for the current slot corresponding to a second scrambling code. Thus, for antenna chunk $x_0$, profile values are updated and stored for a total of 4,096 delays. As shown in the last column, for each chip of antenna chunk $x_0$ processed, 3,072 profile values are updated and stored at a time.

For antenna chunk $x_1$, the profile values for delays lag=2,048 to 4,096 are updated and stored for the previous slot, and the profile values for delays lag=0 to 2,048 are updated and stored for the current slot. Thus, for antenna chunk $x_1$, profile values are updated and stored for a total of 4,096 delays. For each chip of antenna chunk $x_1$ processed, 3,072 profile values are updated and stored at a time.

For antenna chunk $x_2$, the profile values for delays lag=3,072 to 4,096 are updated and stored for the previous slot, and the profile values for delays lag=0 to 3,072 are updated and stored for the current slot. Thus, for antenna chunk $x_2$, profile values are updated and stored for a total of 4,096 delays. For each chip of antenna chunk $x_2$ processed, 3,072 profile values are updated and stored at a time.

For antenna chunk $x_3$, no profile values are updated or stored for the previous slot, and the profile values for delays lag=0 to 4,096 are updated and stored for the current slot. Thus, for antenna chunk $x_3$, profile values are updated and stored for a total of 4,096 delays. For each chip of antenna chunk $x_3$ processed, 3,584 profile values are updated and stored at a time.

For antenna chunk $x_4$, no profile values are updated or stored for the previous slot, and the profile values for delays lag=0 to 4,096 are updated and stored for the current slot. Thus, for antenna chunk $x_4$, profile values are updated and stored for a total of 4,096 delays. For each chip of antenna chunk $x_4$ processed, 3,584 profile values are updated and stored at a time.

As can be seen from Table I, the processing power for chunks $x_0$, $x_1$, and $x_2$, which are processed for two scrambling codes, is less than the processing power for chunks $x_3$ and $x_4$, which are processed for only one scrambling code. Further, as can be seen from Table I, the memory usage for all five chunks $x_0$ to $x_5$ is the same (i.e., 4,096 profiles), not taking into account the memory needed to store each antenna chunk $x_t$.

Figure 6:
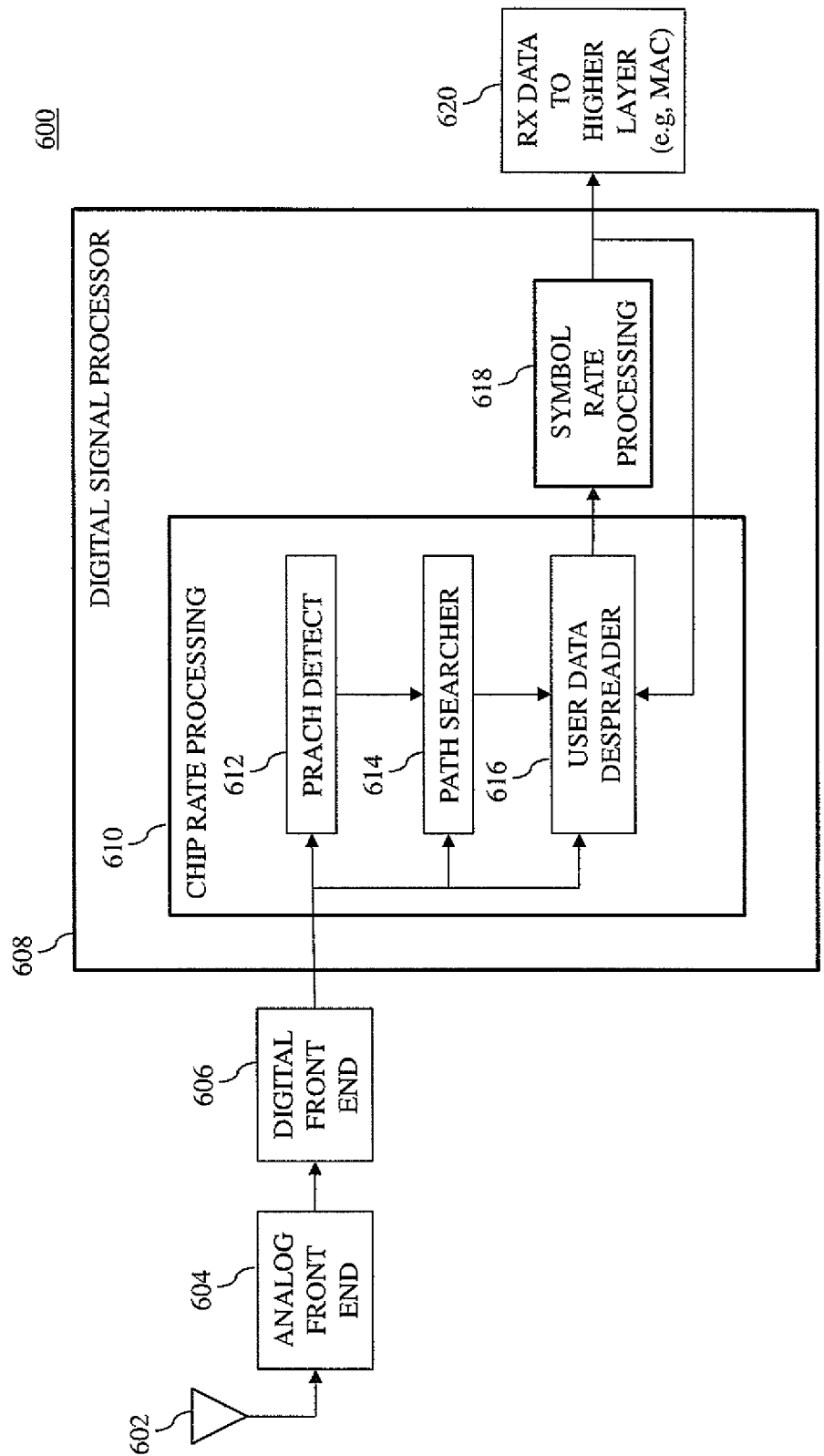
FIG. 6 shows a simplified block diagram of a receiver according to one embodiment of the present invention that may be used to implement the preamble detection methods of FIGS. 1 to 6.

FIG. 6 shows a simplified block diagram of a receiver 600 according to one embodiment of the present invention that may be used to implement the preamble detection methods of FIGS. 1 to 5. Receiver 600 receives incoming data via antenna 602 and processes the data using analog front end 604. Analog front end 604, which performs processing such as radio-frequency processing, filtering, amplifying, and analog-to-digital conversion, provides a digital signal to digital front end 606. Digital front end 606, which performs processing such as demodulation, filtering, down sampling and carrier extraction, provides a demodulated signal to digital signal processor 608, which includes chip-rate processing 610 and symbol level processing 618. Chip-rate processing 610, which processes the demodulated digital signal in a chip rate domain (e.g., two times a 3.84 MHz oversampling rate), performs functions such as PRACH detection 612, path searching 614, channel estimation and timing and frequency offset estimation (not shown), and user data despreading 616. PRACH detection 612 detects random access requests from new users, and computes the multi-path (each path is called a finger) delays of those users. Path searching 614 computes and tracks multi-path delays for each existing user. Channel estimation and timing and frequency offset estimation (not shown) estimates the channel characteristics and timing and frequency offsets for each user. Channel estimation and timing and frequency offset estimation may be part of the user data despreading 616. User data despreading 616 despreads the antenna data and determines the data symbols that were most likely transmitted by each user based on the path delays and channel characteristics. Note each symbol is spread at the transmitter by a channel code and can comprise, for example 2 chips through 512 chips. Symbol rate processing 618 reformats (deinterleaving/de-rate-matching) the antenna data to its original form, using for example, deinterleaving and de-rate matching. Further, symbol rate processing 618 performs decoding based on the particular error-correction code used by the transmitter. Yet further, symbol rate processing 618 may also recombine data from previous partial, unsuccessful transmissions, if such unsuccessful transmissions occurred. The antenna data is then passed on to a higher layer 620 for further processing.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

The present invention can also be embodied in the form of a bitstream or other sequence of signal values stored in a non-transitory recording medium generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A processor-implemented method for incrementally detecting a preamble in a data signal transmitted from a transmitter and received at a receiver, the method comprising:

processing a portion of data of a set of data in the received data signal to update a set of correlation profiles based on the processed portion of data, wherein each correlation profile corresponds to a different possible preamble; wherein a total size of the set of data corresponds to a length of a preamble to be detected in the received data signal plus a specified maximum propagation delay; and wherein a size of the processed portion of data is smaller than the total size of the set of data; and performing an intermediate preamble detection attempt corresponding to the processed portion of data to determine whether a correlation profile in the updated set of correlation profiles corresponds to one of the different possible preambles, wherein the intermediate preamble detection attempt is performed before processing another portion of data in the set of data.

2. The processor-implemented method of claim 1, wherein each correlation profile comprises a plurality of profile values; and wherein performing an intermediate preamble detection attempt comprises:

generating an intermediate threshold value based on the updated set of correlation profiles;

comparing the profile values of the correlation profiles to the intermediate threshold value; and determining, before processing all data in the set of data, whether or not a correlation profile corresponds to one of the different possible preambles based on said comparing of the profile values of the correlation profiles to the intermediate threshold value.

3. The processor-implemented method of claim 2, wherein the intermediate threshold is proportional to:

$$C1 \times \text{sum}/((\text{max\_lag1}(t) - \text{min\_lag1}(t) + 1) \times \text{num\_possible\_signatures}),$$

wherein:

C1 is a constant that is determined heuristically;

sum is generated by summing correlation profiles in the updated set of correlation profiles;

min_lag1($t$) is a minimum propagation delay;

max_lag1($t$) is a maximum propagation delay, wherein min_lag1($t$) and max_lag1($t$) bound a range that is smaller than a range of all possible propagation delays; and num_possible_signatures is a maximum number of signatures employed by a system in which the transmitter and receiver are implemented.

4. The processor-implemented method of claim 1, wherein the preamble comprises a signature code and a scrambling code;
wherein the scrambling code is detected before said processing the portion of data of the set of data in the received data signal to update the set of correlation profiles; and
wherein performing the intermediate preamble detection attempt comprises determining whether a correlation profile in the updated set of correlation profiles corresponds to the signature code.

5. The processor-implemented method of claim 4, wherein:
each correlation profile corresponds to a different possible signature code;
each correlation profile comprises a plurality of profile values, each profile value corresponding to a different combination of the possible signature code and a possible propagation delay of the preamble; and
for each possible signature code, all of the profile values corresponding to the possible signature code are updated prior to updating other profile values corresponding to another possible signature code.

6. The processor-implemented method of claim 4, wherein:
each correlation profile corresponds to a different possible signature code;
each correlation profile comprises a plurality of profile values, each profile value corresponding to a different combination of the possible signature code and a possible propagation delay of the preamble; and
for each possible propagation delay, the profile values corresponding to all possible signature codes are updated prior to updating other profiles values corresponding to another possible propagation delay.

7. The processor-implemented method of claim 1, wherein the correlation profiles are updated concurrently using the Fast Hadamard Transform.

8. The processor-implemented method of claim 1, wherein each correlation profile comprises a plurality of profile values, each profile value corresponding to a different possible propagation delay of the preamble; and
wherein said processing the portion of data of the set of data in the received data signal to update the set of correlation profiles comprises updating the profile values wherein each profile value is updated by correlating chips of the portion with chips of a different combination of a possible preamble and a possible propagation delay.

9. A processor-implemented method for incrementally detecting a preamble in a data signal transmitted from a transmitter and received at a receiver, the method comprising:
processing a portion of a set of data to update a set of correlation profiles, wherein each correlation profile corresponds to a different possible preamble; wherein a size of the set of data corresponds to a length of the preamble plus a specified maximum propagation delay; and wherein a size of the portion is smaller than the size of the set of data;
performing an intermediate preamble detection attempt corresponding to the portion to determine whether a correlation profile in the set of correlation profiles corresponds to the preamble, wherein the intermediate preamble detection attempt is performed before processing all data in the set of data;
processing a subsequent portion of data of the set of data to update the set of correlation profiles; and
performing a subsequent preamble detection attempt corresponding to the subsequent portion of data of the set of data to determine whether a correlation profile in the updated set of correlation profiles corresponds to the preamble.

10. The processor-implemented method of claim 9, wherein the portion of data and the subsequent portion of data are non-overlapping chunks of received data, wherein a length of each non-overlapping chunk is smaller than a length of the set of data;
wherein each correlation profile comprises a plurality of profile values;
wherein performing an intermediate preamble detection attempt comprises updating a subset of the plurality of profile values based on the portion of data; and
wherein processing a subsequent portion of data of the set of data to update the set of correlation profiles comprises updating a different subset of the plurality of profile values based on the subsequent portion of data.

11. The processor-implemented method of claim 9, wherein the subsequent preamble detection attempt is a subsequent intermediate preamble detection attempt that is performed before processing all data in the set of data.

12. The processor-implemented method of claim 9, wherein the subsequent portion of data of the set of data is a final portion of data of the set of data;
wherein processing a subsequent portion of data of the set of data to update the set of correlation profiles comprises processing the final portion of data to update the correlation profiles; and
wherein performing the subsequent preamble detection attempt is a final preamble detection attempt that is performed for the set of data.

13. The processor-implemented method of claim 12, wherein each correlation profile comprises a plurality of profile values; and
wherein performing a subsequent preamble detection attempt comprises:
generating a final threshold value based on the updated set of correlation profiles;
comparing the profile values of correlation profiles to the final threshold value; and
determining whether or not a correlation profile in the updated set of correlation profiles corresponds to the preamble based on the comparing of the profile values of correlation profiles to the final threshold value.

14. The processor-implemented method of claim 13, wherein performing an intermediate preamble detection attempt comprises:
generating an intermediate threshold value based on the updated set of correlation profiles;
comparing the profile values of the correlation profiles to the intermediate threshold value; and
determining, before processing all data in the set of data, whether or not a correlation profile corresponds to the preamble based on said comparing of the profile values of the correlation profiles to the intermediate threshold value.

15. An apparatus adapted to incrementally detect a preamble in a data signal transmitted from a transmitter and received at a receiver, the apparatus comprising at least one processor adapted to:
  process a portion of data of a set of data in the received data signal to update a set of correlation profiles based on the processed portion of data, wherein each correlation profile corresponds to a different possible preamble; wherein a total size of the set of data corresponds to a length of a preamble to be detected in the received data signal plus a specified maximum propagation delay; and wherein a size of the processed portion of data is smaller than the total size of the set of data; and
  perform an intermediate preamble detection attempt corresponding to the processed portion of data to determine whether a correlation profile in the updated set of correlation profiles corresponds to one of the different possible preambles, wherein the intermediate preamble detection attempt is performed before processing another portion of data in the set of data.

16. The apparatus of claim 15, wherein each correlation profile comprises a plurality of profile values; and
  wherein the at least one processor is adapted to perform the intermediate preamble detection attempt by:
    generating an intermediate threshold value based on the updated set of correlation profiles;
    comparing the profile values of the correlation profiles to the intermediate threshold value; and
    determining, before processing all data in the set of data, whether or not a correlation profile corresponds to the preamble based on the comparing of the profile values of the correlation profiles to the intermediate threshold value.

17. The apparatus of claim 15, wherein:
  the preamble comprises a signature code and a scrambling code; and
  the scrambling code is detected before processing the portion of data; and
  the at least one processor is adapted to perform the intermediate preamble detection attempt by determining whether a correlation profile in the updated set of correlation profiles corresponds to the signature code.

18. The apparatus of claim 15, wherein the at least one processor is further adapted to:
  process a subsequent portion of data of the set of data to update the set of correlation profiles; and
  perform a subsequent preamble detection attempt corresponding to the subsequent portion of data of the set of data to determine whether a correlation profile in the updated set of correlation profiles corresponds to the preamble.

19. The apparatus of claim 18, wherein the portion of data and the subsequent portion of data are non-overlapping chunks of received data, wherein a length of each non-overlapping chunk is smaller than a length of the set of data;
  wherein each correlation profile comprises a plurality of profile values;
  wherein processing the portion of data to update the set of correlation profiles comprises updating a subset of the plurality of profile values based on the portion of data; and
  wherein processing the subsequent portion of data to update the set of correlation profiles comprises updating a different subset of the plurality of profile values based on the subsequent portion of data.

20. The apparatus of claim 18, wherein the subsequent portion of data of the set of data is a final portion of data of the set of data;
  wherein the subsequent preamble detection attempt is a final preamble detection attempt;
  wherein the at least one processor is adapted to perform the subsequent preamble detection attempt by processing the final portion of data to update the correlation profiles; and
  wherein the at least one processor is adapted to perform the final preamble detection attempt for the set of data.

21. The apparatus of claim 20, wherein each correlation profile comprises a plurality of profile values; and
  wherein the at least one processor is adapted to perform the final preamble detection attempt by:
    generating a final threshold value based on the updated set of correlation profiles;
    comparing the profiles of the correlation profiles to the final threshold value; and
    determining whether or not a correlation profile in the updated set of correlation profiles corresponds to one of the different possible preambles based on the comparing the profiles of the correlation profiles to the final threshold value.

* * * * *